(12) United States Patent
Chiba

(10) Patent No.: US 10,155,535 B2
(45) Date of Patent: *Dec. 18, 2018

(54) CONTROL APPARATUS FOR ELECTRIC POWER STEERING

(71) Applicant: MAZDA MOTOR CORPORATION, Hiroshima (JP)

(72) Inventor: Masaki Chiba, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/496,757

(22) Filed: Apr. 25, 2017

(65) Prior Publication Data

US 2017/0313348 A1    Nov. 2, 2017

(30) Foreign Application Priority Data

May 2, 2016  (JP) ................................. 2016-092242

(51) Int. Cl.
  *B62D 6/00*   (2006.01)
  *B62D 5/04*   (2006.01)

(52) U.S. Cl.
  CPC ........... *B62D 6/008* (2013.01); *B62D 5/0409* (2013.01); *B62D 5/0463* (2013.01); *B62D 5/0466* (2013.01)

(58) Field of Classification Search
  CPC .... B62D 6/008; B62D 5/0409; B62D 5/0463; B62D 5/0466
  USPC ...................... 701/41, 42; 180/446, 443, 402
  See application file for complete search history.

(56) References Cited

U.S. PATENT DOCUMENTS

| | | | |
|---|---|---|---|
| 2002/0116105 A1* | 8/2002 | Chen .................... | B62D 5/0463 701/41 |
| 2005/0060074 A1* | 3/2005 | Sakai .................... | B62D 6/002 701/41 |
| 2006/0086561 A1* | 4/2006 | Hidaka .................. | B62D 5/008 180/446 |

(Continued)

FOREIGN PATENT DOCUMENTS

| | | |
|---|---|---|
| JP | H06-344939 A | 12/1994 |
| JP | 2003-01174 A | 1/2003 |

(Continued)

OTHER PUBLICATIONS

JP Office Action dated Feb. 6, 2018, from corresponding JP Appl No. 2016-092241, with English translation, 6 pp.

(Continued)

*Primary Examiner* — Shardul D Patel
(74) *Attorney, Agent, or Firm* — Studebaker & Brackett PC

(57) ABSTRACT

The present application discloses a control apparatus for electric power steering, including: a gain determination portion configured to determine a first assist gain in correspondence to a steering torque acting on a steering shaft when a driver rotates a steering wheel; and a gain adjuster which adjusts the first assist gain in response to a change in a rotation direction of the steering wheel to generate a second assist gain. The gain adjuster generates the second assist gain so as to reduce a difference between a first torque, which is required of the driver rotating the steering wheel to a predetermined rotation position, and a second torque, which is required of the driver holding the steering wheel at the rotation position.

3 Claims, 9 Drawing Sheets

(56) References Cited

U.S. PATENT DOCUMENTS

| | | | | |
|---|---|---|---|---|
| 2008/0035411 A1* | 2/2008 | Yamashita | ............. | B62D 5/046 180/443 |
| 2014/0058630 A1* | 2/2014 | Kezobo | ................ | B62D 5/0472 701/42 |
| 2015/0057892 A1* | 2/2015 | Tamaizumi | .......... | B62D 5/0463 701/42 |
| 2015/0251691 A1* | 9/2015 | Tamaizumi | .......... | B62D 5/0412 701/41 |
| 2016/0144889 A1* | 5/2016 | Gotou | .................. | B62D 5/0466 180/446 |
| 2017/0137055 A1* | 5/2017 | Hirate | ................. | B62D 5/0463 |

FOREIGN PATENT DOCUMENTS

| | | |
|---|---|---|
| JP | 2003-019974 | 1/2003 |
| JP | 2016-000580 A | 1/2016 |
| JP | 2016-022927 A | 2/2016 |

OTHER PUBLICATIONS

JP Office Action dated Feb. 6, 2018, from corresponding JP Appl No. 2016-092242, with English translation, 6 pp.

\* cited by examiner

CONTROL APPARATUS FOR ELECTRIC POWER STEERING

TECHNICAL FIELD

The present invention relates to a control apparatus configured to control electric power steering.

BACKGROUND ART

Various control technologies for controlling electric power steering have been developed (c.f. JP 2016-580 A and JP 2016-22927 A). JP 2016-580 A discloses technologies for reducing a calculation load for calculating an assist torque which assists steering of a driver. JP 2016-22927 A discloses control technologies which do not only output appropriate assist torque but also have a function of reducing vibration which is transmitted to a steering wheel.

FIG. 9 shows a graph used for performance evaluation of a steering mechanism mounted on a vehicle. The performance evaluation of the steering mechanism is described with reference to FIG. 9.

The horizontal axis of the graph of FIG. 9 represents a steering angle (i.e. a rotation angle of a steering wheel). The steering angle of "0°" means a rotation position of the steering wheel when the vehicle runs straightforwardly. With regard to the graph of FIG. 9, a driver rotates the steering wheel by "120°". The steering wheel is returned to the steering angle of "0°" after being held at the steering angle of "120°".

The vertical axis of the graph of FIG. 9 represents a required torque which is required for the driver to apply to the steering wheel during the aforementioned steering wheel operation. The graph of FIG. 9 shows two curves FWC, RTC. The curve FWC indicates a change in required torque under a change in steering angle from "0°" to "120°". The curve RTC indicates a change in required torque under a change in steering angle from "120°" to "0°".

The difference in required torque between the curves FWC, RTC is referred to as "hysteresis". The hysteresis is used as an index for evaluating performance of the steering mechanism. When the hysteresis is excessively large at the steering angle of "120°", there is worse responsiveness of the steering mechanism.

The aforementioned control technologies do not address a reduction in hysteresis. The reduction in hysteresis under the aforementioned control technologies requires changes of various control parameters.

It is an object of the present invention to provide control technologies for easily reducing the hysteresis.

SUMMARY OF INVENTION

A control apparatus for electric power steering according to one aspect of the present invention includes: a gain determination portion configured to determine a first assist gain in correspondence to a steering torque acting on a steering shaft when a driver rotates a steering wheel; and a gain adjuster which adjusts the first assist gain in accordance with a change in a rotation direction of the steering wheel to generate a second assist gain. The gain adjuster generates the second assist gain so as to reduce a hysteresis defined as a difference between a first torque, which is required of the driver rotating the steering wheel to a predetermined rotation position, and a second torque, which is required of the driver holding the steering wheel at the rotation position.

The control apparatus may easily reduce the hysteresis.

Objects, features and advantages of the control apparatus for electric power steering become more apparent from the following detailed description and the accompanying drawings.

DESCRIPTION OF EMBODIMENTS

First Embodiment

The inventors of the present invention have developed a control apparatus configured to output assist gains which are suitable for an operation of rotating a steering wheel toward a predetermined rotation position and an operation of returning the steering wheel from the predetermined rotation position, respectively. An exemplary control apparatus is described in the first embodiment.

Figure 1:
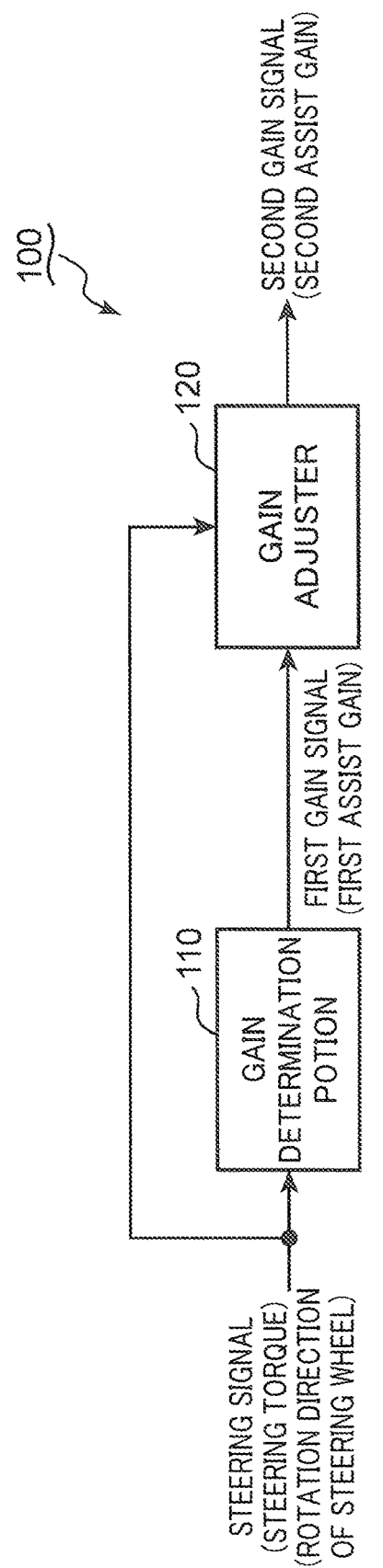
FIG. 1 is a conceptual block diagram of a control apparatus according to the first embodiment.

FIG. 1 is a conceptual block diagram of a control apparatus 100 according to the first embodiment. The control apparatus 100 is described with reference to FIG. 1.

The control apparatus 100 includes a gain determination portion 110 and a gain adjuster 120. A steering signal is input to the gain determination portion 110 and the gain adjuster 120. The steering signal includes torque information about a steering torque acting on a steering shaft (not shown) when a driver rotates a steering wheel (not shown) and rotation direction information about a rotation direction of the steering wheel. The steering signal may be generated by a torque sensor (not shown) configured to detect a steering torque and the rotation direction of the steering wheel. Alternatively, the steering signal may be a combination of an output signal of a torque sensor configured to detect a steering torque and an output signal of a rotation direction sensor configured to detect the rotation direction of the steering wheel. The principles of the present embodiment are not limited to a particular device for generating the steering signal.

When the steering signal is input to the gain determination portion 110, the gain determination portion 110 refers to the torque information included in the steering signal. The gain determination portion 110 determines a first assist gain in correspondence to the steering torque indicated by the torque information. The gain determination portion 110 may determine the first assist gain on the basis of various known technologies about an assist map. Therefore, the principles of the present embodiment are not limited to a particular method for determining the first assist gain.

The gain determination portion 110 generates a first gain signal indicating the determined first assist gain. The first gain signal is output from the gain determination portion 110 to the gain adjuster 120.

The gain adjuster 120 receives the steering signal and the first gain signal. The gain adjuster 120 refers to the rotation direction information included in the steering signal to determine whether there is a change in rotation direction of the steering wheel. When there is a change in rotation direction of the steering wheel, the gain adjuster 120 processes the first gain signal to generate a second gain signal indicating a second assist gain which is different from the first assist gain. Otherwise, the gain adjuster 120 may allow for a passage of the first gain signal. The gain adjuster 120 may be a program designed to generate the second gain signal from the first gain signal, or may be an arithmetic element (e.g. central processing unit (CPU)) configured to execute the program.

Figure 2:
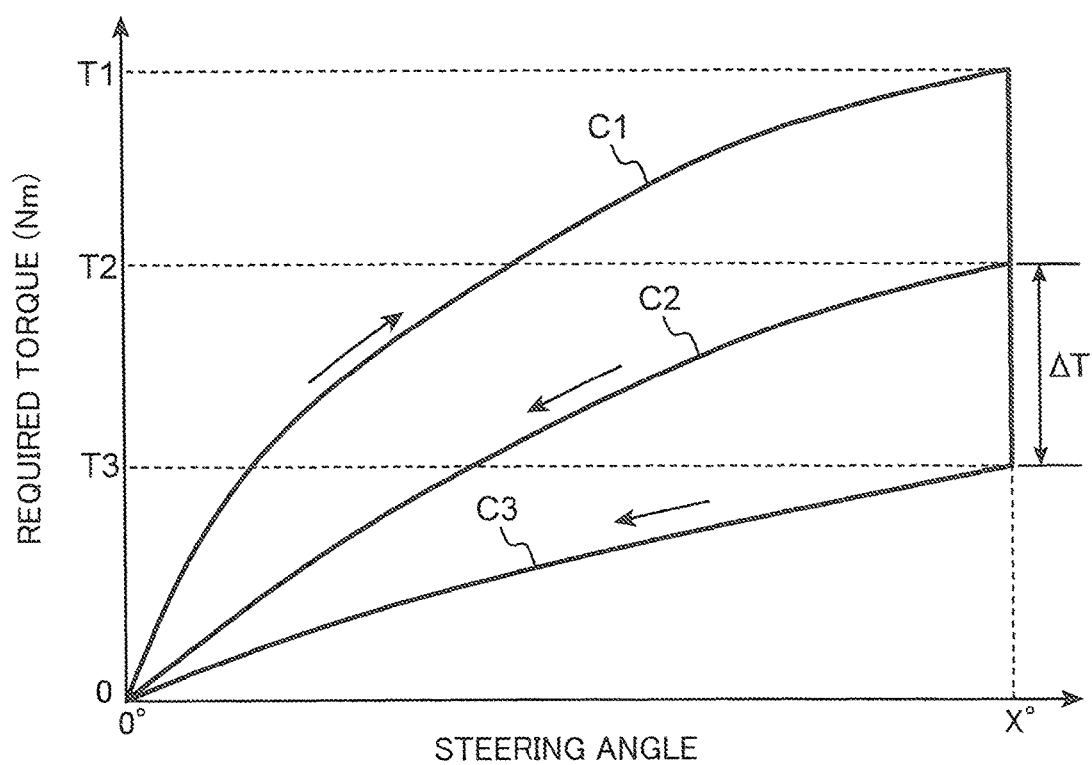
FIG. 2 is a graph showing a hysteresis.

FIG. 2 is a graph showing a hysteresis. The control apparatus 100 is further described with reference to FIGS. 1 and 2.

The horizontal axis of the graph in FIG. 2 represents a steering angle (i.e. a rotation angle of the steering wheel (not shown)). The steering angle of "0°" (hereinafter referred to as "reference position") may mean the rotation position of the steering wheel when the vehicle runs straightforwardly. Alternatively, the term "reference position" may have another definition. The principles of the present embodiment are not limited by the definition of the term "reference position".

With reference to the graph of FIG. 2, the driver rotates the steering wheel from the reference position by "X° (e.g. 120°)". The steering wheel is returned to the reference position after being held at the steering angle of "X°".

The vertical axis of the graph of FIG. 2 represents a required torque, which is required for the driver to applies to the steering wheel during the aforementioned steering wheel operation. The graph of FIG. 2 shows three curves C1, C2, C3. The curve C1 indicates a change in required torque under a change in steering angle from "0°" to "X°". The curves C2, C3 indicate changes in required torque under a change in steering angle from "X°" to "0°".

The curve C2 is obtained under a condition that the gain adjuster 120 operates. The curve C3 is obtained under a condition that the gain adjuster 120 does not operate.

The required torque indicated by the curve C1 at the steering angle of "X°" is denoted by the symbol "T1". The required torque indicated by the curve C2 at the steering angle of "X°" is denoted by the symbol "T2". The required torque indicated by the curve C3 at the steering angle of "X°" is denoted by the symbol "T3". With regard to the present embodiment, the first torque is exemplified by the required torque T1. The rotation position is exemplified by the steering angle of "X°".

A difference (i.e. hysteresis) between the required torques T1, T3 depends on a mechanical structure of a steering mechanism (not shown) mounted on the vehicle. In general, the difference between the required torques T1, T3 becomes large when there is a large mechanical friction loss of the steering mechanism.

In FIG. 2, the differential value between the required torques T3, T2 is denoted by the symbol "$\Delta T$". The gain adjuster 120 may process the first gain signal to determine the second assist gain so that the hysteresis is reduced by the differential value $\Delta T$.

The differential value $\Delta T$ (i.e. an adjustment amount given to the hysteresis characteristics by the gain adjuster 120) may be determined in advance by a designer designing the control apparatus 100. For example, the designer may acquire data in correspondence to the curves C1, C3 to obtain the hysteresis characteristics which are determined by the mechanical structure of the steering mechanism.

With reference to the graph shown in FIG. 2, the difference between the required torques T1, T3 is very large. This means that the steering mechanism does not quickly follow an operation for the steering wheel by the driver. The designer may determine the differential value $\Delta T$ so that a comfortable steering wheel operation is implemented (i.e. so that there is a decreased difference between the required torque T1 and a minimum torque necessary for holding the steering wheel at the steering angle of "X°"). The designer may change a program executed by the gain adjuster 120 so that the gain adjuster 120 subtracts the determined differential value $\Delta T$ from a mechanical hysteresis determined by the mechanical structure of the steering mechanism. Consequently, the designer may easily change the hysteresis characteristics without changing the gain determination portion 110 (i.e. the designer can obtain the hysteresis characteristics indicated by the curves C1, C2). With regard to the present embodiment, the second torque is exemplified by the minimum torque necessary for holding the steering wheel at the steering angle of "X°".

Second Embodiment

The inventors of the present invention have established control principles described in the context of the first embodiment on the basis of a mathematical model. An exemplary mathematical model about the hysteresis reduction control is described in the second embodiment.

Figure 3:
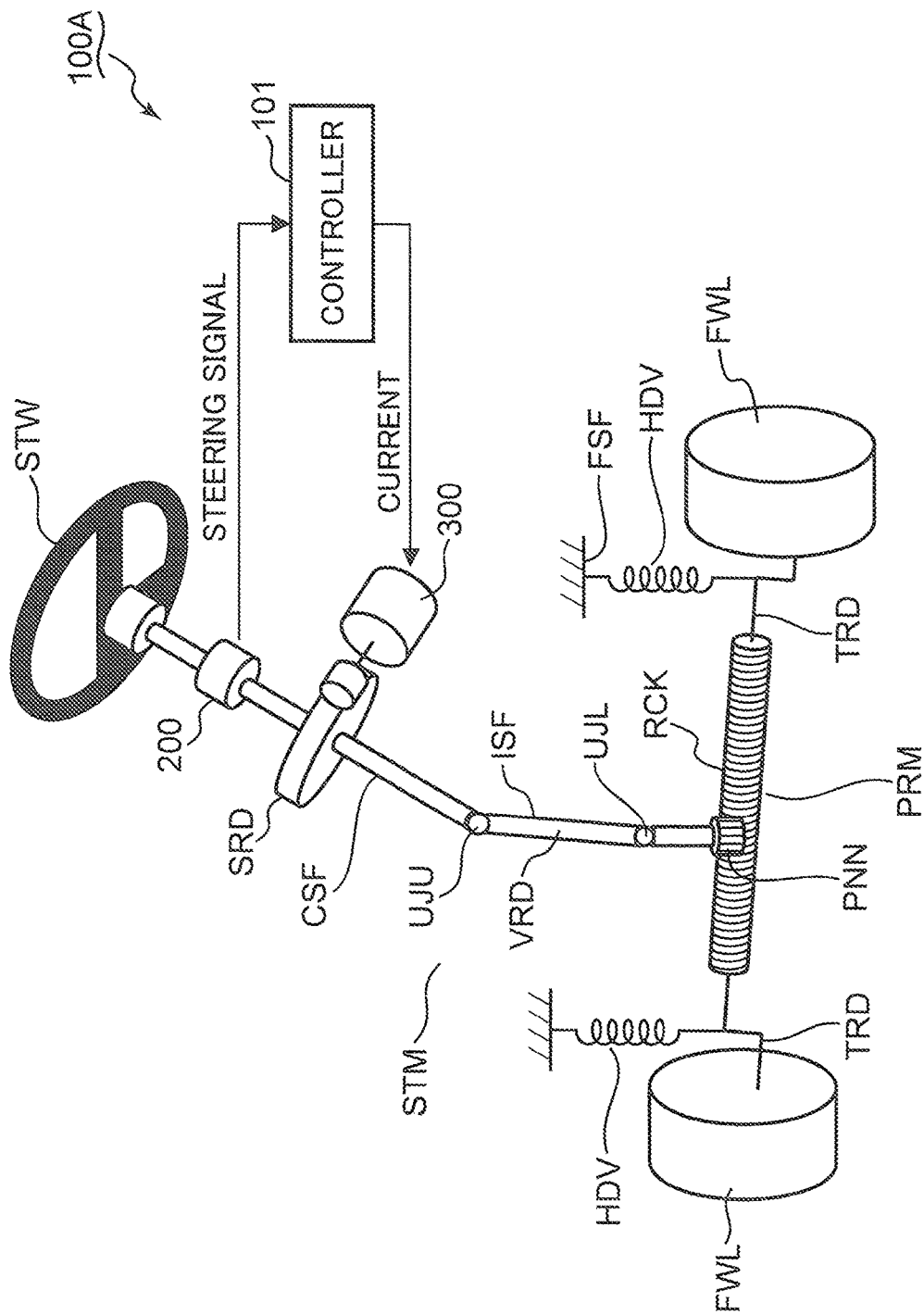
FIG. 3 is a conceptual view of a control apparatus according to the second embodiment.

FIG. 3 is a conceptual view of a control apparatus 100A according to the second embodiment. The control apparatus 100A is described with reference to FIGS. 1 to 3.

The control apparatus 100A includes a controller 101, a torque sensor 200 and a motor 300. The controller 101 includes the gain determination portion 110 and the gain adjuster 120 which are described with reference to FIG. 1. Therefore, the description about the gain determination portion 110 and the gain adjuster 120 may be applied to the controller 101.

The controller 101 may be an arithmetic circuit including a CPU configured to execute a program which is designed to obtain functions of the gain determination portion 110 and the gain adjuster 120. The arithmetic circuit may include other various electronic elements such as a memory in which programs are stored. Alternatively, the controller 101 may be a programmable logic device (PLD) or another arithmetic element which is designed to obtain functions of the gain determination portion 110 and the gain adjuster 120. The principles of the present embodiment are not limited to a particular electronic component used for the controller 101.

The torque sensor 200 generates the steering signal described with reference to FIG. 1. The steering signal is output from the torque sensor 200 to the controller 101. With regard to the present embodiment, the signal generator is exemplified by the torque sensor 200.

The motor 300 outputs an assist torque under control of the controller 101.

FIG. 3 shows a steering mechanism STM, two front wheels FWL, a front subframe FSF and two suspension devices HDV in addition to the control apparatus 100A. The torque sensor 200 is attached to the steering mechanism STM. The motor 300 is connected to the steering mechanism STM to assist steering under control of the controller 101.

The front subframe FSF is a frame at a lowermost part of a front portion of the vehicle. An engine (not shown) is mounted on the front subframe FSF. Each of the two suspension devices HDV is connected to the front subframe FSF and the steering mechanism STM.

The steering mechanism STM includes a steering wheel STW, a column shaft CSF, an intermediate shaft ISF, a pinion rack mechanism PRM, two tie rods TRD and a speed reducer SRD. The column shaft CSF extends downward from the steering wheel STW to be connected to the intermediate shaft ISF. The intermediate shaft ISF includes a vertical rod VRD and two universal joints UJU, UJL. The vertical rod VRD extends substantially vertically. The universal joint UJU is attached to the upper end of the vertical rod VRD. The universal joint UJU connects the upper end of the vertical rod VRD to the lower end of the column shaft CSF. The universal joint UJL is attached to the lower end of the vertical rod VRD. The universal joint UJL connects the lower end of the vertical rod VRD to the pinion rack mechanism PRM.

The torque sensor 200 is connected to the column shaft CSF. The torque sensor 200 detects a steering torque which acts on the column shaft CSF in response to a rotation of the steering wheel STW. In addition, the torque sensor 200 detects a rotation direction of the steering wheel STW. The torque sensor 200 generates a steering signal indicating a magnitude and direction of the steering torque and the rotation direction of the steering wheel STW. The steering signal is output from the torque sensor 200 to the controller 101. The controller 101 controls the motor 300 on the basis of the control principles described in the context of the first embodiment.

Like the torque sensor 200, the speed reducer SRD is attached to the column shaft CSF. The torque sensor 200 is situated between the speed reducer SRD and the steering wheel STW.

The motor 300 is connected to the speed reducer SRD. An assist torque generated by the motor 300 under control of the controller 101 is input to the speed reducer SRD. The speed reducer SRD amplifies the assist torque with a predetermined reduction ratio to rotate the column shaft CSF. The intermediate shaft ISF rotates together with the column shaft CSF.

The pinion rack mechanism PRM includes a pinion PNN and a rack RCK. The rack RCK extends substantially horizontally between the two front wheels FWL. The pinion PNN is engaged with the rack RCK. The pinion PNN rotates together with the intermediate shaft ISF. Accordingly, the rack RCK moves linearly between the two front wheels FWL.

The two tie rods TRD extend from both ends of the rack RCK, respectively. The two tie rods TRD are connected to the two front wheels FWL, respectively. In addition, the two tie rods TRD are also connected to the two suspension devices HDV, respectively. The linear motion of the rack RCK is transmitted to the two front wheels FWL via the two tie rods TRD. Accordingly, orientations of the two front wheels FWL are changed.

The total torque acting on the column shaft CSF is defined as a sum of a steering torque which is applied to the column shaft CSF by a driver rotating the steering wheel STW and an assist torque which is applied to the column shaft CSF by the motor 300 via the speed reducer SRD. In short, the total torque acting on the column shaft CSF is defined by the following expression.

$$T_{clm}=T_{h1}+T_{ast} \quad \text{[Math. 1]}$$

$T_{clm}$: Total torque acting on column shaft
$T_{h1}$: Steering torque applied to column shaft by driver
$T_{ast}$: Assist torque applied by motor The total torque acting on the column shaft CSF is redefined by the following expression which uses the first assist gain output from the gain determination portion 110 described with reference to FIG. 1.

$$T_{clm}=T_{h1}+T_{ast}=T_{h1}+K_{a1}T_{h1}=T_{h1}(1+K_{a1}) \quad \text{[Math. 2]}$$

$K_{a1}$: First assist gain

The parameter "$T_{h1}$" in the aforementioned expression corresponds to the required torque T1 described with reference to FIG. 2.

A designer designing the control apparatus 100A may acquire data (e.g. the graph shown in FIG. 2) about hysteresis characteristics of the steering mechanism STM without activating the gain adjuster 120 described with reference to FIG. 1. The acquired data is a mechanical hysteresis, which is mainly derived from mechanical characteristics (e.g. friction loss) of the steering mechanism STM. The designer may refer to the acquired data to determine an adjustment amount of the hysteresis characteristics. In this case, the adjustment amount of the hysteresis characteristics may be defined by the following expression.

$$\Delta T_h = T_{h2} - T_{h1} \quad \text{[Math. 3]}$$

$\Delta T_h$: Determined adjustment amount
$T_{h2}$: Required torque be achieved by gain adjuster
  (In the absence of mechanical hysteresis)

The parameter "$\Delta T_h$" in the aforementioned expression corresponds to the differential value $\Delta T$ shown in FIG. 2. The parameter "$T_{h2}$" in the aforementioned expression may mean a required torque which needs to be achieved by the gain adjuster 120 in the absence of the mechanical hysteresis. The parameter "$\Delta T_h$" is a positive value (i.e. $T_{h2}>T_{h1}$). A hysteresis in correspondence to the value of the parameter "$\Delta T_h$" is subtracted from the mechanical hysteresis of the steering mechanism STM. Accordingly, the hysteresis decreases.

The total torque acting on the column shaft CSF is redefined by the following expression which uses the parameter "$T_{h2}$" and the second assist gain output from the gain adjuster 120.

$$T_{clm}=T_{h2}(1+K_{a2})$$

$$K_{a2} \neq K_{a1} \quad \text{[Math. 4]}$$

$K_{a2}$: Second assist gain

From Expressions 3 and 4, the following equation is established.

$$T_{h1}(1+K_{a1})=T_{h2}(1+K_{a2}) \quad \text{[Math. 5]}$$

From the aforementioned equation, the second assist gain is defined by the following expression.

$$K_{a2}=\frac{T_{h1}(1+K_{a1})}{T_{h2}}-1=\frac{K_{a1}+\frac{T_{h1}-T_{h2}}{T_{h1}}}{\frac{T_{h2}}{T_{h1}}}=\frac{K_{a1}-\frac{\Delta T_h}{T_{h1}}}{\frac{T_{h2}}{T_{h1}}} \quad \text{[Math. 6]}$$

The value of the parameter "$T_{h1}$" is determined by the torque information included in the steering signal. The gain adjuster 120 may perform calculation processes for the aforementioned expression to determine the second assist gain (i.e. value of parameter "$K_{a2}$").

The designer designing the control apparatus 100A may store the value of the parameter "$T_{h2}$" in the gain adjuster 120 (c.f. FIG. 1) as a fixed value. Alternatively, the designer may associate the value of the parameter "$T_{h2}$" with the value of the parameter "$T_{h1}$". In this case, the gain adjuster 120 may store information about a correlation between the parameters "$T_{h1}$", "$T_{h2}$" as a lookup table. Otherwise, the gain adjuster 120 may store the parameter "$T_{h2}$" as a function of the parameter "$T_{h1}$".

Since the parameter "$\Delta T_h$" is defined as a positive value, the control apparatus 100A may control the motor 300 so as to decrease the hysteresis when the steering angle of the steering wheel STW is held at "X°".

Third Embodiment

A designer may design various control apparatuses on the basis of the design principles described in the context of the aforementioned embodiments. An exemplary control apparatus is described in the third embodiment.

Figure 4:
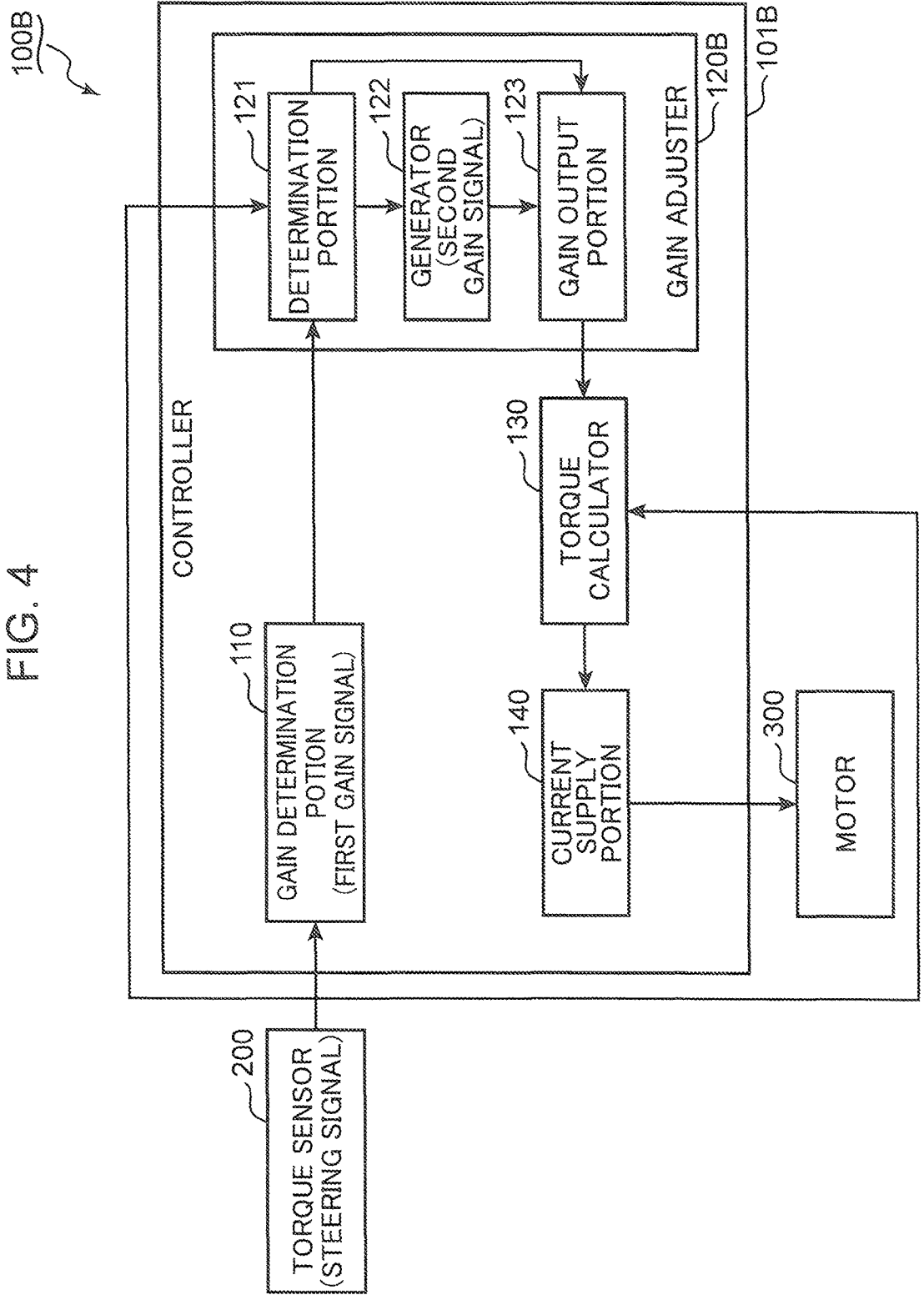
FIG. 4 is a conceptual block diagram of a control apparatus according to the third embodiment.

FIG. 4 is a conceptual block diagram of a control apparatus 100B according to the third embodiment. The control apparatus 100B is described with reference to FIGS. 2 to 4. The description of the aforementioned embodiments is applicable to elements denoted by the same reference symbols as the aforementioned embodiments.

Like the second embodiment, the control apparatus 100B includes the torque sensor 200 and the motor 300. The description of the second embodiment is applied to these elements.

The control apparatus 100B further includes a controller 101B. Like the first embodiment, the controller 101B includes the gain determination portion 110. The description of the first embodiment is applied to the gain determination portion 110.

The controller 101B further includes a gain adjuster 120B, a torque calculator 130 and a current supply portion 140. The first gain signal is output from the gain determination portion 110 to the gain adjuster 120B. The gain adjuster 120B allows for a passage of the first gain signal while the steering wheel STW (c.f. FIG. 3) is rotated from the reference position (i.e. at the steering angle of "0°": c.f. FIG. 2) to the steering angle of "X°" (c.f. FIG. 2). In this case, the torque calculator 130 may receive the first gain signal via the gain adjuster 120B. While the steering wheel STW (c.f. FIG. 3) is returned from the steering angle of "X°" to the reference position, the gain adjuster 120B uses the calculation technologies described in the context of the second embodiment to determine the second assist gain and generate the second gain signal indicating the determined second assist gain. In this case, the torque calculator 130 may receive the second gain signal from the gain adjuster 120B.

The steering signal is output from the torque sensor 200 to the torque calculator 130. The torque calculator 130 uses the output gain (i.e. the first or second assist gain) output from the gain adjuster 120B and the torque information included in the steering signal to calculate the assist torque. For example, the torque calculator 130 may multiply the output gain by the steering torque, which is indicated by the steering signal, to determine the assist torque. Various known calculation technologies for determining the assist torque are applicable to processes of the torque calculator 130. Therefore, the principles of the present embodiment are not limited to a particular calculation process executed by the torque calculator 130.

The torque calculator 130 may be a CPU or another arithmetic circuit configured to execute a program which is designed to calculate the assist torque from the output gain and the steering torque. The principles of the present embodiment are not limited to a particular arithmetic element used as the torque calculator 130.

The torque calculator 130 generates the assist torque information indicating the determined assist torque. The assist torque information is output from the torque calculator 130 to the current supply portion 140.

The current supply portion 140 determines a magnitude of a current on the basis of the assist torque information, the current being supplied to the motor 300. The conversion process from the assist torque into the current value depends on input/output characteristics of the motor 300. Therefore, the principles of the present embodiment are not limited to a particular calculation process for calculating the current value from the assist torque.

The current supply portion 140 supplies the current having the determined value to the motor 300. The motor 300 outputs the assist torque in response to the supplied current. The assist torque is input to the speed reducer SRD (c.f. FIG. 3). The current supply portion 140 may be a current generation circuit designed to generate a current. The current generation circuit may include a CPU configured to execute a program which is designed for the conversion process from the assist torque into the current value and a power supply configured to output electric power.

The gain adjuster 120B includes a determination portion 121, a generator 122 and a gain output portion 123. The steering signal is output from the torque sensor 200 to the determination portion 121. The first gain signal is output from the gain determination portion 110 to the determination portion 121.

The determination portion 121 determines whether the rotation direction of the column shaft CSF is coincident with the direction of the steering torque which is applied to the column shaft CSF (c.f. FIG. 3) by the driver. With regard to the present embodiment, the steering shaft is exemplified by the column shaft CSF.

For example, when the driver rotates the steering wheel STW clockwise, the rotation direction information included in the steering signal may indicate a "positive" value. On the other hand, when the driver rotates the steering wheel STW counterclockwise, the rotation direction information included in the steering signal may indicate a "negative" value. When the steering torque acts on the column shaft CSF in the clockwise direction, the torque information included in the steering signal may indicate a "positive" value. On the other hand, when the steering torque acts on the column shaft CSF in the counterclockwise direction, the torque information included in the steering signal may indicate a "negative" value.

Under the aforementioned output characteristics for the steering signal, when the signs of the values indicated by the rotation direction information and the torque information are coincident, the determination portion 121 may determine that the rotation direction of the column shaft CSF is coincident with the direction of the steering torque. When the signs of the values indicated by the rotation direction information and the torque information are different from each other, the determination portion 121 may determine that the rotation direction of the column shaft CSF is different from the direction of the steering torque.

The determination portion 121 determining that the rotation direction of the column shaft CSF is coincident with the direction of the steering torque outputs the first gain signal to the gain output portion 123. The first gain signal is output from the gain output portion 123 to the torque calculator 130 as a signal indicating the output gain. In this case, the torque calculator 130 uses the first assist gain indicated by the first gain signal to calculate the assist torque.

The determination portion 121 determining that the rotation direction of the column shaft CSF is different from the direction of the steering torque outputs the first gain signal and the steering signal to the generator 122. The generator 122 uses the first gain signal and the steering signal to calculate the second assist gain on the basis of the calculation technologies described in the context of the second embodiment. The generator 122 then generates the second gain signal indicating the second assist gain. The second gain signal is output from the generator 122 to the torque calculator 130 via the gain output portion 123. In this case, the torque calculator 130 uses the second assist gain indicated by the second gain signal to calculate the assist torque.

Figure 5:
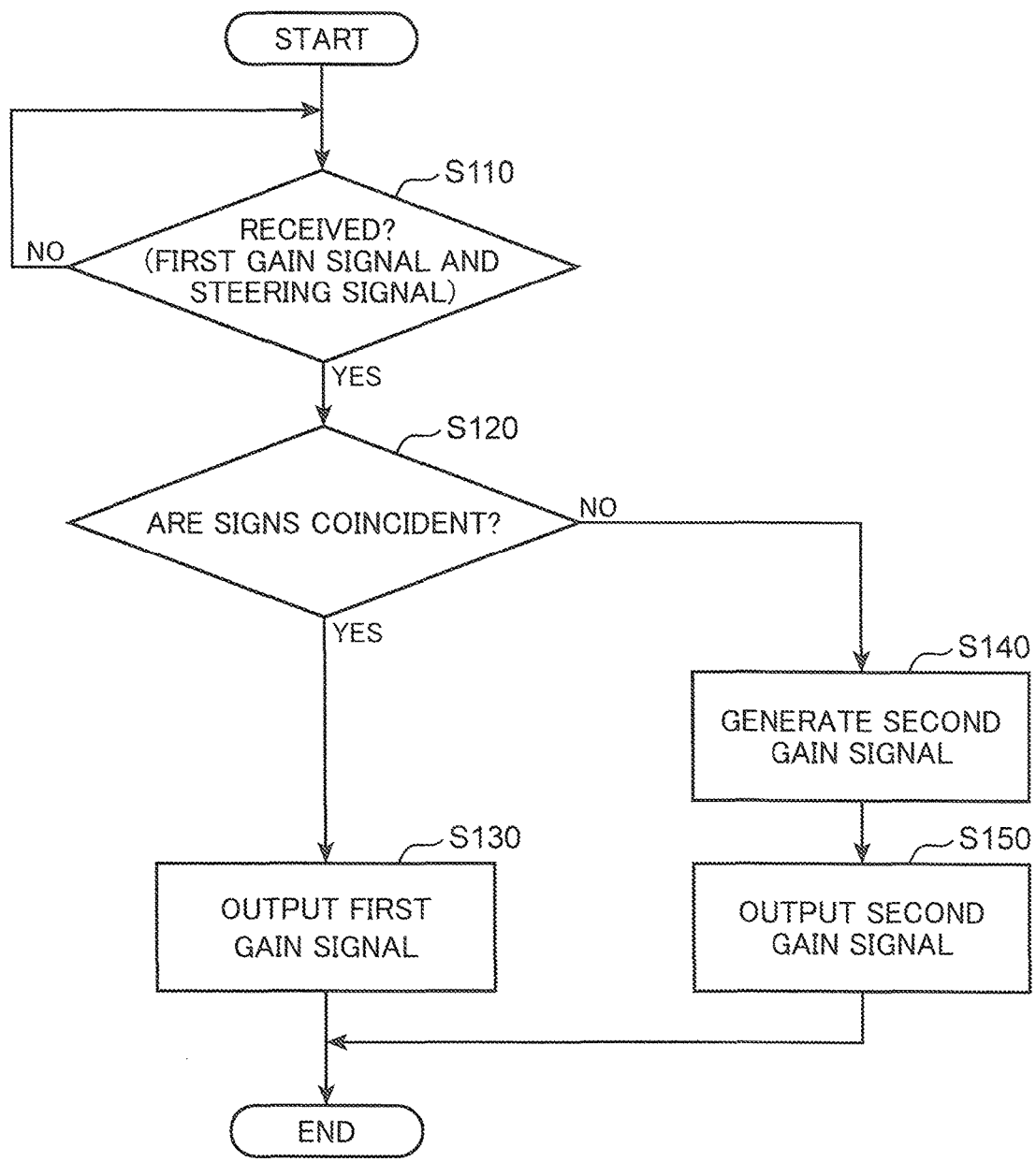
FIG. 5 is a conceptual flowchart showing processes executed by a gain adjuster of the control apparatus depicted in FIG. 4.

FIG. 5 is a schematic flowchart showing processes executed by the gain adjuster 120B. The processes executed by the gain adjuster 120B are described with reference to FIGS. 4 and 5.

(Step S110)

The determination portion 121 waits for reception of the first gain signal and the steering signal. When the determination portion 121 receives both of the first gain signal and the steering signal, Step S120 is executed. Otherwise, Step S110 is repeated.

(Step S120)

The determination portion 121 determines whether the signs of the values indicated by the rotation direction information and the torque information are coincident. When the signs of the values indicated by the rotation direction information and the torque information are coincident, Step S130 is executed. Otherwise, Step S140 is executed.

(Step S130)

The gain output portion 123 outputs the first gain signal as a signal indicating the output gain.

(Step S140)

The generator 122 calculates the second assist gain on the basis of the calculation technologies described in the context of the second embodiment. The generator 122 then generates the second gain signal indicating the calculated second assist gain. After the generation of the second gain signal, Step S150 is executed.

(Step S150)

The gain output portion 123 generates the second gain signal as a signal indicating the output gain.

Fourth Embodiment

The control apparatus may change a gain so as to be suitable for a vehicle speed. A control apparatus configured to generate a gain which is suitable for a vehicle speed is described in the fourth embodiment.

Figure 6:
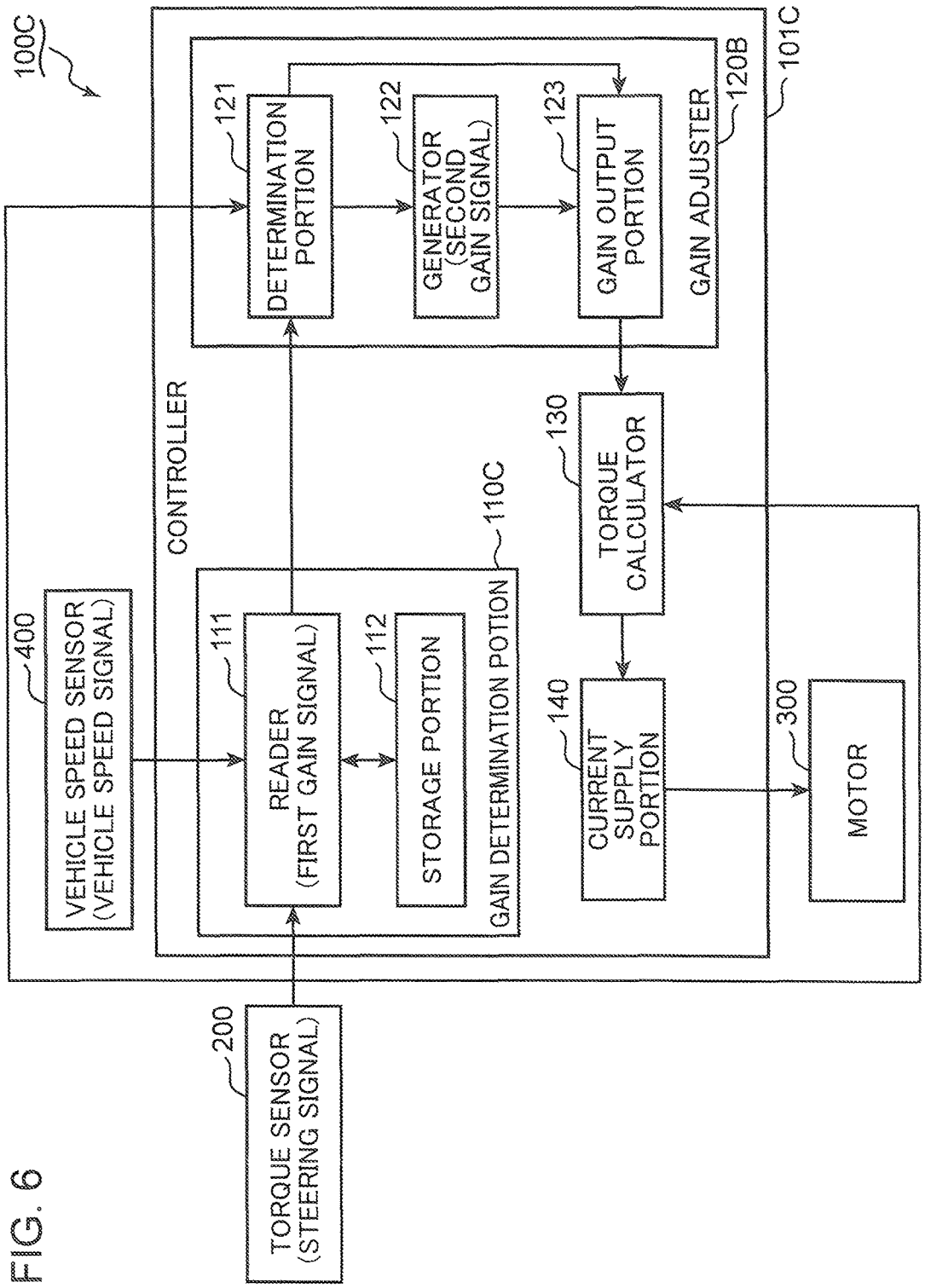
FIG. 6 is a conceptual block diagram of a control apparatus according to the fourth embodiment.

FIG. 6 is a conceptual block diagram of a control apparatus 100C according to the fourth embodiment. The control apparatus 100C is described with reference to FIG. 6. The description of the third embodiment is applicable to elements denoted by the same reference symbols as the third embodiment.

Like the third embodiment, the control apparatus 100C includes the torque sensor 200 and the motor 300. The description of the third embodiment is applied to these elements.

The control apparatus 100C further includes a controller 101C and a vehicle speed sensor 400. Like the third embodiment, the controller 101C includes the gain adjuster 120B, the torque calculator 130 and the current supply portion 140. The description of the third embodiment is applied to these elements.

The controller 101C further includes a gain determination portion 110C. The gain determination portion 110C includes a reader 111 and a storage portion 112. The vehicle speed sensor 400 determines a speed of the vehicle from a vehicle speed pulse. The vehicle speed sensor 400 generates a vehicle speed signal indicating the determined speed of the vehicle. The vehicle speed signal is output from the vehicle speed sensor 400 to the reader 111.

The storage portion 112 stores information about the first assist gain in association with the vehicle speed. The reader 111 reads the vehicle speed from the vehicle speed signal. The first assist gain in association with the read vehicle speed is read from the storage portion 112 by the reader 111. The reader 111 generates the first gain signal indicating the read first assist gain. The first gain signal is output from the reader 111 to the determination portion 121. The storage portion 112 may be a general memory element. The reader 111 may be a CPU or another arithmetic element configured to execute a program designed for a reading process of data from a memory element and a signal generation process for generating a signal from the read data.

Figure 7:
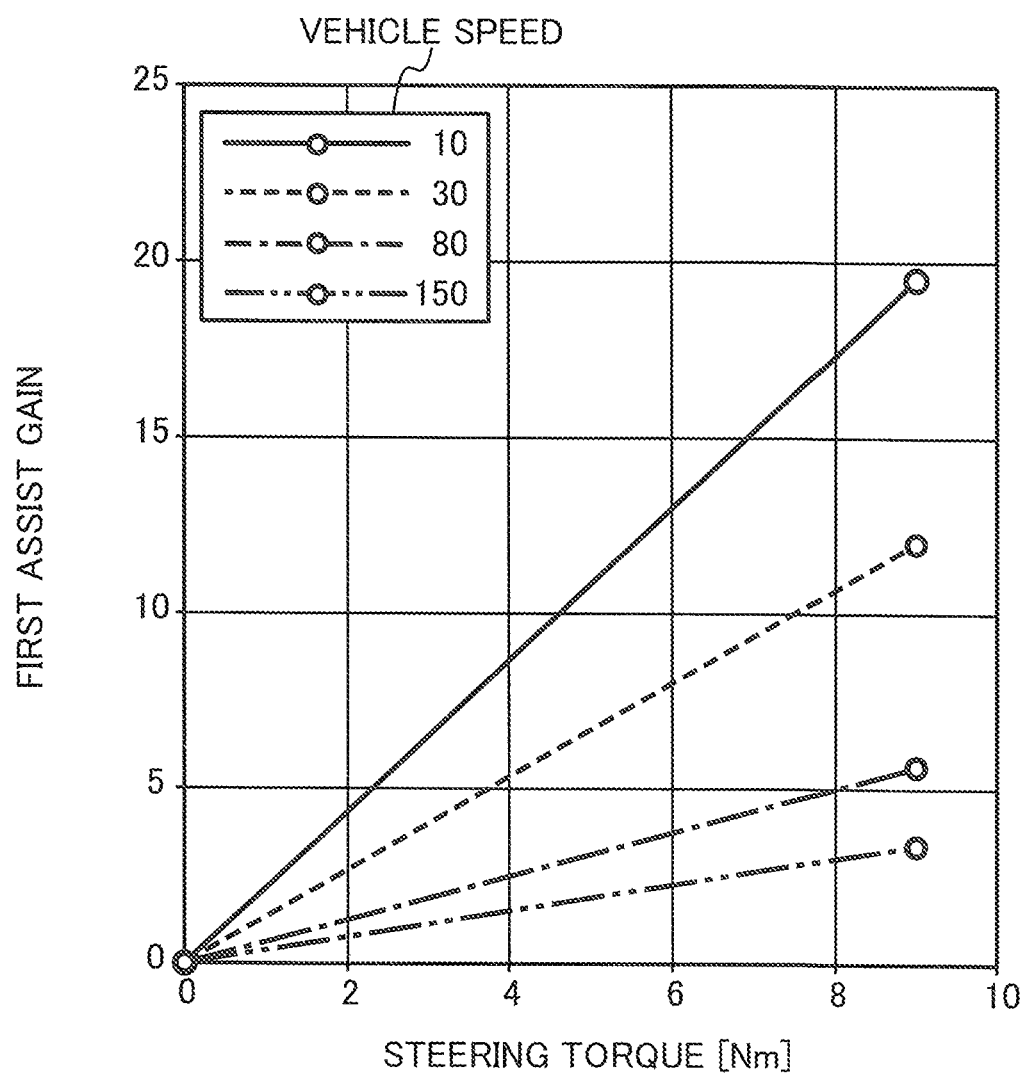
FIG. 7 is a graph conceptually showing exemplary data stored in a storage portion of the control apparatus depicted in FIG. 6.

FIG. 7 is a graph conceptually showing exemplary data stored in the storage portion 112. The data stored in the storage portion 112 is described with reference to FIGS. 3 and 5 to 7.

The horizontal axis of the graph of FIG. 7 represents the steering torque instructed by the steering signal, which is output from the torque sensor 200. The vertical axis of the graph of FIG. 7 represents the first assist gain. The graph of FIG. 7 shows four straight lines in correspondence to vehicle speeds of "10 km/h", "30 km/h", "80 km/h" and "150 km/h". Each of the four straight lines represents a relationship between the steering torque and the first assist gain.

When the vehicle speed is "80 km/h", the vehicle speed sensor 400 generates the vehicle speed signal indicating a vehicle speed of "80 km/h". The vehicle speed signal is output from the vehicle speed sensor 400 to the reader 111.

The torque sensor 200 detects the steering torque acting on the column shaft CSF. When the steering torque is "8 Nm", the torque sensor 200 generates the steering signal indicating the steering torque of "8 Nm". The steering signal is output from the torque sensor 200 to the reader 111.

The reader 111 reads the first assist gain in association with the vehicle speed of "80 km/h" and the steering torque of "8 Nm" from the storage portion 112. With reference to FIG. 7, the first assist gain in association with the vehicle speed of "80 km/h" and the steering torque of "8 Nm" is "5". The reader 111 generates the first gain signal which indicates the first assist gain having a value of "5". The first gain signal is output to the determination portion 121.

The gain adjuster 120B processes the first gain signal on the basis of the signal processing principles described in the context of the third embodiment. In Step S120 described with reference to FIG. 5, if the determination portion 121 determines that the direction of the steering torque is coincident with the rotation direction of the steering wheel STW (c.f. FIG. 3), the first gain signal is output from the determination portion 121 to the torque calculator 130 via the gain output portion 123. In Step S120, if the determination portion 121 determines that the direction of the steering torque is different from the rotation direction of the steering wheel STW (c.f. FIG. 3), the first gain signal is output to the generator 122.

The generator 122 executes the calculation processes described in the context of the second embodiment to determine the second assist gain. When a designer gives a value of "2" to the parameter "$\Delta T_h$" (c.f. the second embodiment) in a calculation program executed by the generator 122, the generator 122 may calculate the second assist gain having a value of "6.3". The generator 122 generates the second gain signal indicating the determined second assist gain. The second gain signal is output from the generator 122 to the torque calculator 130 via the gain output portion 123.

Fifth Embodiment

The control principles described in the context of the aforementioned embodiments are applicable to control of various steering mechanisms. An exemplary control apparatus including a motor connected to a pinion of a steering mechanism is described in the fifth embodiment.

Figure 8:
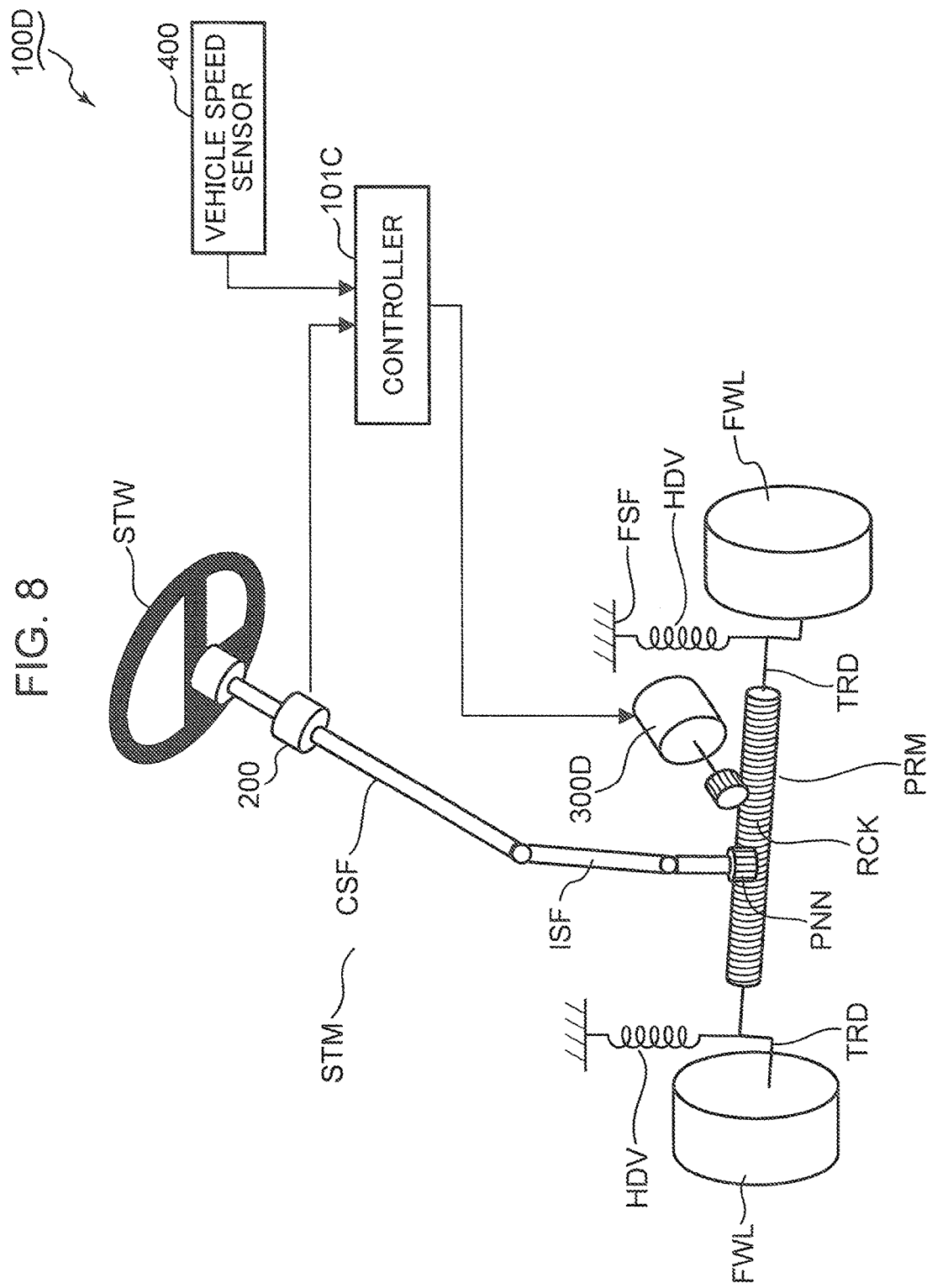
FIG. 8 is a conceptual view of a control apparatus according to the fifth embodiment.
Figure 9:
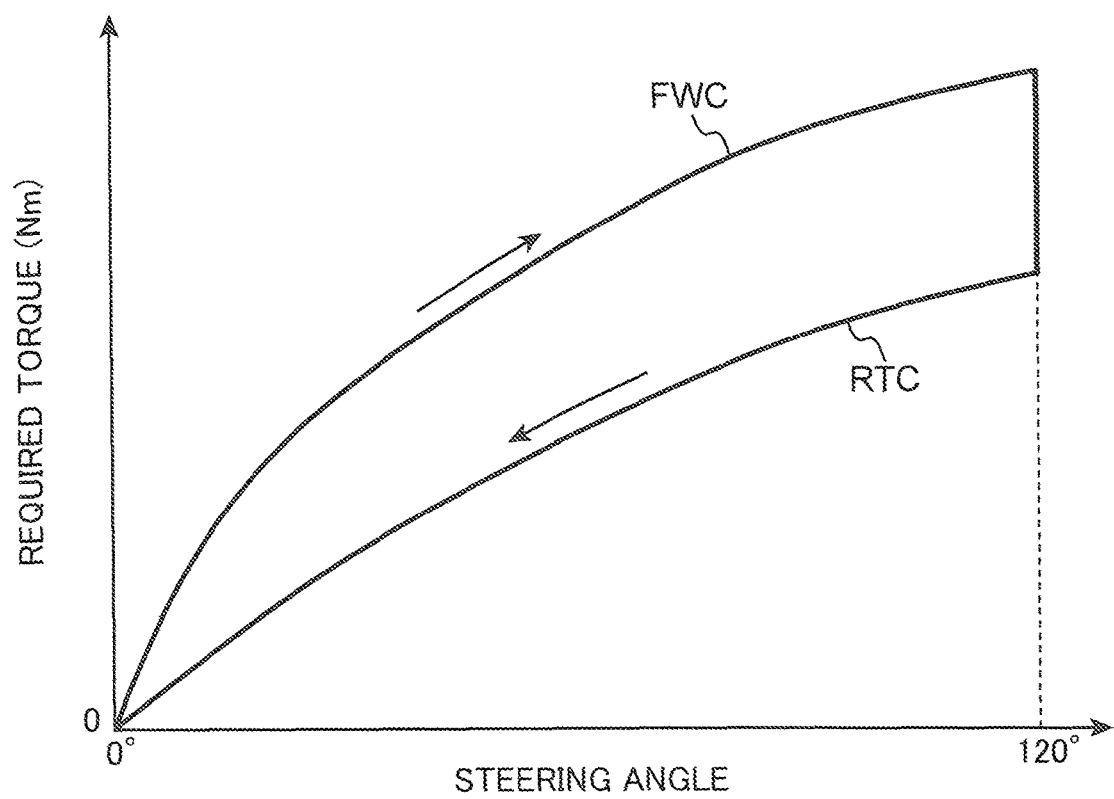
FIG. 9 is a graph used for performance evaluation of a steering mechanism mounted on a vehicle.

FIG. 8 is a conceptual view of a control apparatus 100D according to the fifth embodiment. The control apparatus 100D is described with reference to FIGS. 3 and 8. The description of the aforementioned embodiments is applicable to elements denoted by the same reference symbols as the aforementioned embodiments.

Like the fourth embodiment, the control apparatus 100D includes the controller 101C, the torque sensor 200 and the vehicle speed sensor 400. The description of the fourth embodiment is applied to these elements.

Like FIG. 3, FIG. 8 shows the two front wheels FWL, the front subframe FSF and the two suspension devices HDV. The description of the second embodiment is applied to these elements.

FIG. 8 further shows a steering mechanism STN. Like the steering mechanism STM described with reference to FIG. 3, the steering mechanism STN includes the steering wheel STW, the column shaft CSF, the intermediate shaft ISF, the pinion rack mechanism PRM and the two tie rods TRD. Unlike the steering mechanism STM, the steering mechanism STN does not include the speed reducer SRD (c.f. FIG. 3).

The control apparatus 100D includes a motor 300D. The motor 300D is connected to the rack RCK. A designer designing the controller 101C may determine the parameter "$\Delta T_h$" (c.f. the second embodiment) so as to be suitable for mechanical hysteresis characteristics of the steering mechanism STN. When there are large mechanical hysteresis characteristics of the steering mechanism STN, the designer may set the parameter "$\Delta T_h$" to a positive value. In this case, the control apparatus 100D may reduce the hysteresis.

The principles in the aforementioned various embodiments may be combined so as to be suitable for requirements for a vehicle. A part of various features described in the context of one of the aforementioned various embodiments may be applied to a control apparatus described in the context of another embodiment.

The control apparatuses for electric power steering described in the context of a variety of the aforementioned embodiments include mainly the following features.

A control apparatus for electric power steering according to one aspect of the aforementioned embodiments includes: a gain determination portion configured to determine a first assist gain in correspondence to a steering torque acting on a steering shaft when a driver rotates a steering wheel; and a gain adjuster which adjusts the first assist gain in response to a change in a rotation direction of the steering wheel to generate a second assist gain. The gain adjuster generates the second assist gain so as to reduce a hysteresis defined as a difference between a first torque, which is required of the driver rotating the steering wheel to a predetermined rotation position, and a second torque, which is required of the driver holding the steering wheel at the rotation position.

According to the aforementioned configuration, since the gain adjuster reduces the difference between the first torque, which is required of the driver rotating the steering wheel to a predetermined rotation position, and the second torque, which is required of the driver holding the steering wheel at the rotation position, a hysteresis is reduced as appropriate. A designer designing the control apparatus may change settings of the gain adjuster to easily provide hysteresis characteristics which are suitable for electric power steering.

With regard to the aforementioned configuration, the second assist gain may be expressed by the following expression. An adjustment amount of the hysteresis may be a positive value.

[Math. 7]

$$\text{Second assist gain} = \frac{\text{First assist gain} - \frac{\text{Adjustment amount of hysteresis}}{\text{First torque}}}{\text{First assist gain} + \frac{\text{Adjustment amount of hysteresis}}{\text{First torque}}}$$

According to the aforementioned configuration, a designer designing the control apparatus may determine an adjustment amount of the hysteresis to easily reduce the hysteresis.

With regard to the aforementioned configuration, the control apparatus may further include a signal generator configured to generate a steering signal which indicates the steering torque and the rotation direction of the steering wheel. The gain adjuster may include: a determination portion configured to determine whether a direction of the steering torque is coincident with the rotation direction of the steering wheel; and a generator configured to generate the second assist gain when the determination portion determines that the direction of the steering torque is different from the rotation direction of the steering wheel.

According to the aforementioned configuration, since the generator generates the second assist gain when the determination portion determines that the direction of the steering torque is different from the rotation direction of the steering wheel, the gain determination portion may execute the same calculation process when the steering wheel is returned from a predetermined rotation position as when the steering wheel is rotated to the predetermined rotation position. Consequently, there is no excessive increase in calculation load on the control apparatus.

With regard to the aforementioned configuration, the control apparatus may further include: a motor configured to output an assist torque for assisting steering; and a torque calculator configured to calculate the assist torque in accordance with the steering torque. The gain adjuster may include a gain output portion configured to selectively output the first or second assist gain to the torque calculator as an output gain. When the generator generates the second assist gain, the torque calculator may calculate the assist torque from the steering torque and the second assist gain, which is output from the gain output portion as the output gain. When the determination portion determines that the direction of the steering torque is coincident with the rotation direction of the steering wheel, the torque calculator may calculate the assist torque from the steering torque and the first assist gain, which is output from the gain output portion as the output gain.

According to the aforementioned configuration, since the torque calculator calculates the assist torque from the steering torque and the first assist gain, which is output from the gain output portion as the output gain when the determination portion determines that the direction of the steering torque is coincident with the rotation direction of the steering wheel, the motor may output an assist torque, which is suitable for an operation of rotating the steering wheel toward a predetermined rotation position. Since the torque calculator calculates the assist torque from the steering torque and the second assist gain, which is output from the gain output portion as the output gain when the generator generates the second assist gain, the motor may output an assist torque, which is suitable for an operation of returning the steering wheel from the predetermined rotation position.

With regard to the aforementioned configuration, the control apparatus may further include a current supply portion configured to supply a current in correspondence to the assist torque to the motor.

According to the aforementioned configuration, since the current supply portion supplies a current in correspondence to the assist torque to the motor, the motor may output assist torques which are suitable for an operation of rotating the steering wheel toward a predetermined rotation position and an operation of returning the steering wheel from the predetermined rotation position, respectively.

The principles in the embodiments are suitably used for designing various vehicles.

This application is based on Japanese Patent application No. 2016-092242 filed in Japan Patent Office on May 2, 2016, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. A control apparatus for electric power steering, comprising:
   a gain determination portion configured to determine a first assist gain based on a steering torque acting on a steering shaft when a driver rotates a steering wheel and a vehicular speed, the first assist gain has a linear relationship with the steering torque at the vehicular speed;
   a gain adjuster which adjusts the first assist gain in response to a change in a rotation direction of the steering wheel to generate a second assist gain;
   a signal generator configured to generate a steering signal which indicates the steering torque and the rotation direction of the steering wheel;
   a motor configured to output an assist torque for assisting steering; and
   a torque calculator configured to calculate the assist torque in accordance with the steering torque,
   wherein the gain adjuster generates the second assist gain so as to reduce a hysteresis defined as a difference between a first torque, which is required of the driver rotating the steering wheel to a predetermined rotation position, and a second torque, which is required of the driver holding the steering wheel at the rotation position,
   wherein the gain adjuster includes (i) a determination portion configured to determine whether a direction of the steering torque is coincident with the rotation direction of the steering wheel, (ii) a generator configured to generate the second assist gain when the determination portion determines that the direction of the steering torque is different from the rotation direction of the steering wheel, and (iii) a gain output portion configured to selectively output the first or second assist gain to the torque calculator as an output gain,
   wherein the torque calculator calculates the assist torque from the steering torque and the second assist gain which is output from the gain output portion as the output gain when the generator generates the second assist gain, and
   wherein the torque calculator calculates the assist torque from the steering torque and the first assist gain which is output from the gain output portion as the output gain when the determination portion determines that the direction of the steering torque is coincident with the rotation direction of the steering wheel.

2. The control apparatus according to claim 1,
   wherein the second assist gain is expressed by an expression shown below, and
   wherein an adjustment amount of the hysteresis is a predetermined positive value:

$$\text{Second assist gain} = \frac{\text{First assist gain} - \frac{\text{Adjustment amount of hysteresis}}{\text{First torque}}}{\text{First assist gain} + \frac{\text{Adjustment amount of hysteresis}}{\text{First torque}}}.$$

3. The control apparatus according to claim 1, further comprising a current supply portion configured to supply a current in correspondence to the assist torque to the motor.

* * * * *